(12) United States Patent
Hirai

(10) Patent No.: US 8,498,024 B2
(45) Date of Patent: Jul. 30, 2013

(54) IMAGE PROCESSING APPARATUS, METHOD, AND STORAGE MEDIUM FOR INFORMATION PROCESSING ACCORDING TO INFORMATION ON A SCANNED SHEET

(75) Inventor: Yoshiyuki Hirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1382 days.

(21) Appl. No.: 11/567,943

(22) Filed: Dec. 7, 2006

(65) Prior Publication Data
US 2007/0147704 A1    Jun. 28, 2007

(30) Foreign Application Priority Data

Dec. 28, 2005    (JP) ................................. 2005-378624

(51) Int. Cl.
*G06K 9/32* (2006.01)
(52) U.S. Cl.
USPC .......... 358/450; 358/1.18; 358/448; 382/176; 382/179; 382/294
(58) Field of Classification Search
USPC ................. 358/1.18, 448, 450; 382/176, 179, 382/294
See application file for complete search history.

(56) References Cited

U.S. PATENT DOCUMENTS

| 4,811,054 | A  | * | 3/1989  | Maehara ........................ 355/40 |
| 5,148,294 | A  | * | 9/1992  | Kurogane et al. ............ 358/448 |
| 6,327,382 | B1 | * | 12/2001 | Kaneda et al. ............... 382/164 |
| 6,487,305 | B2 | * | 11/2002 | Kambe et al. ................ 382/113 |
| 2004/0190059 | A1 | * | 9/2004 | Winter et al. ................ 358/1.15 |
| 2005/0213174 | A1 | * | 9/2005 | Maki et al. .................... 358/540 |

FOREIGN PATENT DOCUMENTS

| JP | 5-006414 | 1/1993 |
| JP | 7-298030 | 11/1995 |

* cited by examiner

*Primary Examiner* — Peter K Huntsinger
(74) *Attorney, Agent, or Firm* — Fitzpatrick, Cella, Harper & Scinto

(57) ABSTRACT

It is an object to provide image processing apparatus and method which can execute a drawing combining instruction and a trimming instruction of illustration/characters or the like on the basis of a disclosure on one sheet in a composite print of a sheet scanning system. When a trimming instruction command is issued, an image process for trimming is executed to a given one of closed areas detected from a drawing instructing area on the sheet. Another image process for a combining process of characters/illustration is executed to the other closed areas.

17 Claims, 14 Drawing Sheets

IMAGE PROCESSING APPARATUS, METHOD, AND STORAGE MEDIUM FOR INFORMATION PROCESSING ACCORDING TO INFORMATION ON A SCANNED SHEET

BACKGROUND OF THE INVENTION

1. Field of the Invention

The invention relates to an image processing apparatus for reading and analyzing an original document on which a print control instruction and a drawing composition instruction have been written, thereby image-processing predetermined image data in accordance with contents instructed to the original and also relates to an image processing method for such an apparatus.

2. Description of the Related Art

In recent years, MFPs (Multi Function Peripherals) each having a scanner unit and a recording unit have been widespread in homes. The number of functions equipped for the MFP is further increasing. For example, in addition to the fundamental functions of the MFP such as copy, PC print, PC scan, and the like, many functions such as film scan, film copy, digital camera direct printing, and the like for the purpose of realizing what is called a "photo-print" have been proposed.

Thus, photograph images obtained by photographing objects by a digital still camera or a silver salt (film-based) camera can be easily printed in the home. Further, not only such a function that the photographs are printed as they are in the home but also a higher advanced photo-printing function of making a modification such as trimming, frame composition, or the like has also started to be proposed. It is an object of the modifying function of the photograph to print a photograph image having higher artistic product characteristics by image-processing a photo-print result so as to obtain a finish which the user likes or combining various raw materials such as frame, illustration, and the like into the photograph.

However, the modifying function of the photograph as mentioned above is generally accompanied with the complicated operation. To execute the photo print by the MFP without using the PC, it is particularly important that a user's desired print result can be provided by the simple and easy-to-understand operation. However, there is such a problem that, as compared with the PC, it is more difficult to allow the MFP of the limited resources to execute the complicated operation.

As one of trials for solving such a problem, there has been proposed a "sheet scanning system" in which a mark sheet written by the user with a pencil, a pen, or the like is read by a scanner of the MFP and printing is performed in accordance with a print control command obtained by analyzing such a mark sheet.

There is a composite print as one of the specific photo print functions of the MFP using the sheet scanning system. The composite print function is a function in which an image which has been handwritten onto a sheet by the user and image files which have been recorded in a memory card or the like inserted in the MFP are combined and printed in accordance with a predetermined layout. According to the composite print function, a photo modifying print by using the RC, which print being provided with the high artistic product characteristics by the handwriting in which an advanced skill is required, can be easily realized by the home-use MFP.

To realize the composite print function, various image processing techniques are necessary. For example, in a copying apparatus or a photograph developing apparatus, a technique in which the handwritten image is scanned and combined with another image (scan original, digital image file, or the like) and the composite image is printed or copied exists.

A technique in which not only the handwritten image and another image are simply combined but also a closed area is detected has been proposed as a more advanced combining processing technique. The closed area is a closed area, for example, an inside area closed by a line. There is a case where a number of such closed areas are included in an illustration or characters drawn by the user. By distinguishing the closed area from the handwritten image and executing a special image process, an expressing ability of the drawing composite print is improved.

For example, if an image process in which the inside portion of an alphabetical character "o" is set to a white-on-black portion, or the like is executed, the user's drawing can be made more conspicuous with respect to the composite image to be combined.

A technique in which an image is trimmed by using the closed area has also been proposed. The "trimming using the closed area" is a function in which the closed area which has been handwritten onto the original is read by the scanner unit and analyzed and a trimming process is executed to predetermined image data.

To use the closed area, it is necessary to certainly detect the closed area from the handwritten image. Various techniques have also been opened with respect to an algorithm for such a detection. For example, a technique for raising a concentration of the scanned image data until the closed area is detected has also been opened in Japanese Patent Application Laid-open No. H07-298030.

As a method of using the closed area, a method of executing a predetermined image process with respect to only the closed area which satisfies a designated predetermined condition has also been proposed in Japanese Patent Application Laid-open No. H05-006414.

To enhance the composite function using the sheet of the MFP, it is effective to use those related arts. However, each of the conventional composite print techniques has been made on the assumption that the single function is executed. That is, nothing is considered with respect to the composite function in the sheet scanning system which is realized by the assembled apparatus such as an MFP.

For example, a conventional application using the PC uses processes in which the user instructs and executes the modification of the image step by step and progresses the image modifying processes in order, thereby creating a target image. In such a case, if an image processing result which the user desires cannot be obtained, the user can return the processing routine to the one-precedent state of the image modifying processes executed to the image.

On the other hand, in the case where the MFP intends to realize the composite print by the sheet scanning system, it is necessary to interpret the instructions of the user in a lump from the read sheet and execute the image modifying processes without receiving the user's instructions step by step with respect to the modification of the image.

According to the sheet scanning system, since it is an object to provide an easy-to-understand user interface, it is desirable to complete the sheet reading operation only once.

SUMMARY OF THE INVENTION

It is an object of the invention to provide an image processing apparatus and an image processing method in which a composite instruction of illustration, characters, or the like and a trimming instruction can be simultaneously executed on the basis of a description of one sheet in a composite print of a sheet scanning system.

Thus, a drawing composite print function by the sheet scanning system of an MFP can be further expanded.

According to the invention, there is provided an image processing apparatus in which a given image and an image which has been handwritten into an area for handwriting an image on a sheet having such an area are combined by reading the sheet, comprising reading means which reads the sheet, analyzing means which analyzes the sheet read by the reading means, detecting means which detects closed areas in the image handwritten in the area after the sheet was analyzed by the analyzing means, image processing means which executes an image process to portions showing the closed areas detected by the detecting means in the handwritten image, combining means which combines the given image and the handwritten image obtained after the image process was executed by the image processing means, and printing means which prints an image combined by the combining means.

According to the invention, in the composite print of the sheet scanning system, such an effect that the composition of the characters/illustration by the handwritten image and the trimming by the handwritten image can be simultaneously instructed by using one sheet is obtained.

Thus, the photo print function by the sheet scanning system which makes the most of the feature of the MFP can be expanded.

Further features of the present invention will become apparent from the following description of exemplary embodiments with reference to the attached drawings.

DESCRIPTION OF THE EMBODIMENT

An MFP 100 has a display unit 1, an operation unit 2, a card interface (I/F) 3, a reading unit 4, and a recording unit 5.

Figure 1A:
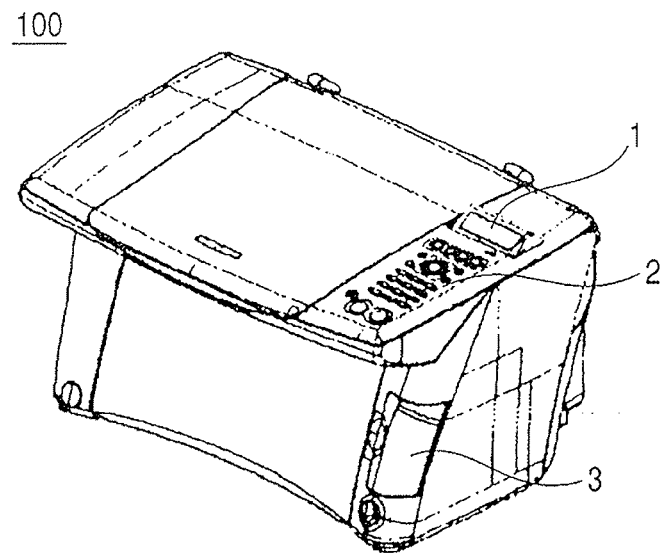
FIGS. 1A and 1B are perspective views showing schematic external views of an image processing apparatus (hereinafter, referred to as an "MFP") 100 of the invention.
Figure 1B:
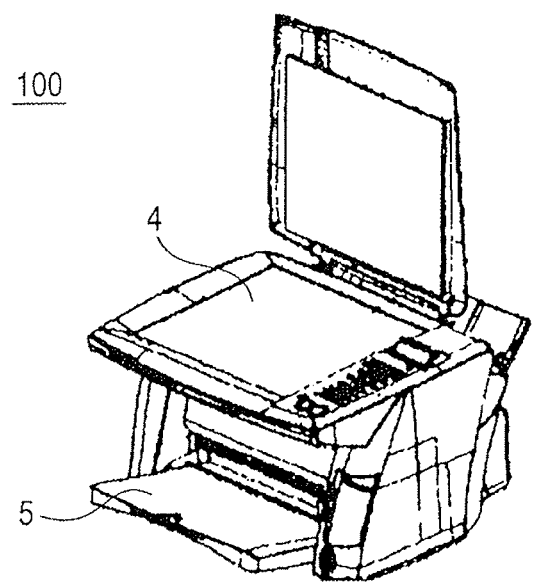

Generally, as shown in FIG. 1A, the MFP 100 is placed in the state where the reading unit 4 and the recording unit 5 have been closed. In the case of copying or performing a sheet scan composite print in an embodiment, the user opens the reading unit 4 and the recording unit 5 as shown in FIG. 1B and executes his desired function.

Figure 2:
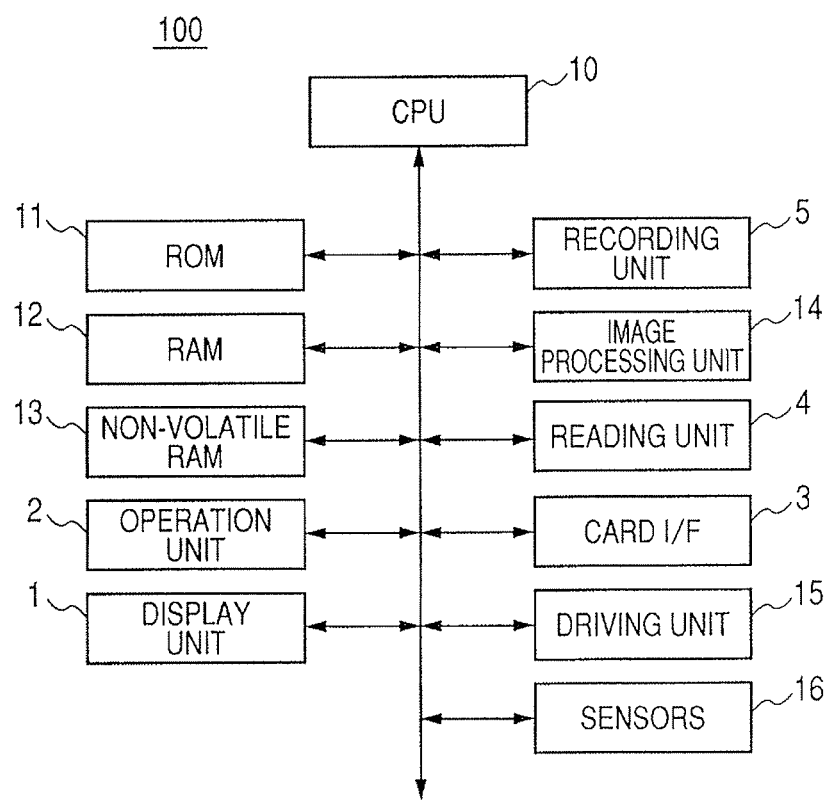
FIG. 2 is a block diagram showing a construction of the MFP 100.

FIG. 2 is a block diagram showing a construction of the MFP 100.

Besides the display unit 1, operation unit 2, card I/F 3, reading unit 4, and recording unit 5, the MFP 100 has a CPU 10, a ROM 11, a RAM 12, a non-volatile RAM 13, an image processing unit 14, a driving unit 15, and sensors 16.

The CPU 10 controls various functions provided for the MFP 100 and executes an image processing program stored in the ROM 11 in accordance with a predetermined operation in the operation unit 2. A control command program and the like of the MFP 100 have been stored in the ROM 11.

The reading unit 4 has a CCD. The CCD reads an image of an original document and outputs analog luminance data of red (R), green (G), and blue (B). In place of the CCD, a contact type image sensor (CIS) can be also used for the reading unit 4.

The reading unit 4 is also used to read a composite print instruction sheet, which will be explained hereinafter.

In accordance with a predetermined operation of the operation unit 2, the card I/F 3 reads an image file which has been photographed by, for example, a digital still camera and recorded in a memory card or the like.

If necessary, a color space of the image data read through the card I/F 3 is converted from a color space (for example, YCbCr) of a digital still camera into a standard RGB color space (for example, NTSC-RGB or sRGB) by the image processing unit 14. On the basis of its header information, various processes which are necessary for an application such as resolution conversion into the number of effective pixels and the like are executed to the read image data as necessary.

Image processes such as image analysis, thumbnail creation, thumbnail correction, output image correction, and the like are executed in the image processing unit 14. Print data obtained by those image processes is stored into the RAM 12. When an amount of print data stored in the RAM 12 reaches a predetermined amount necessary in the case of recording by the recording unit 5, the recording operation by the recording unit 5 is executed.

In the image processes, different print data is formed in dependence on various print settings such as recording sheet size, recording sheet type, date stamp or not, marginless print or not, and the like.

The non-volatile RAM 13 is, for example, an SRAM which is backed up by a battery, or the like and stores data peculiar to the MFP 100, or the like. The operation unit 2 has: a photo direct print start key to select image data stored in a storing medium and start the recording; and a monochro (monochromatic) copy start key to execute a monochro copy or a color copy. The operation unit 2 also has: a color copy start key; a mode key to designate modes such as copy resolution, picture quality, and the like; a stop key to stop the copying operation or the like; a ten-key to input the number of print copies; a registration key; a cursor key to designate image file selecting means for printing; and the like. The CPU 10 detects depressing states of those keys and controls each unit in accordance with the depressing states.

The display unit 1 has a liquid crystal display (LCD) of a dot matrix type and an LCD driver and displays various contents on the basis of the control of the CPU 10.

The recording unit 5 is constructed by an ink jet head of an ink jet type, a general-purpose IC, and the like, reads out the recording data stored in the RAM 12 and prints and outputs it as a hard copy under the control of the CPU 10.

The driving unit 15 is constructed by: stepping motor(s) to drive a feed roller and a discharge roller in the operation of each of the reading unit 4 and the recording unit 5; gears to transfer driving force(s) of the stepping motor(s); driver circuit(s) to control the stepping motors; and the like.

The sensors 16 are constructed by: a recording paper width sensor; a recording paper presence/absence sensor; an original width sensor; an original presence/absence sensor; a recording medium detecting sensor; and the like. The CPU 10 detects the states of the original and the recording paper on the basis of information obtained from those sensors.

In the embodiment, an MFP without the display unit 1 can be also used in place of the MFP 100 and the embodiment is not limited to its construction.

An outline of the operation of the embodiment will now be described.

Figure 3:
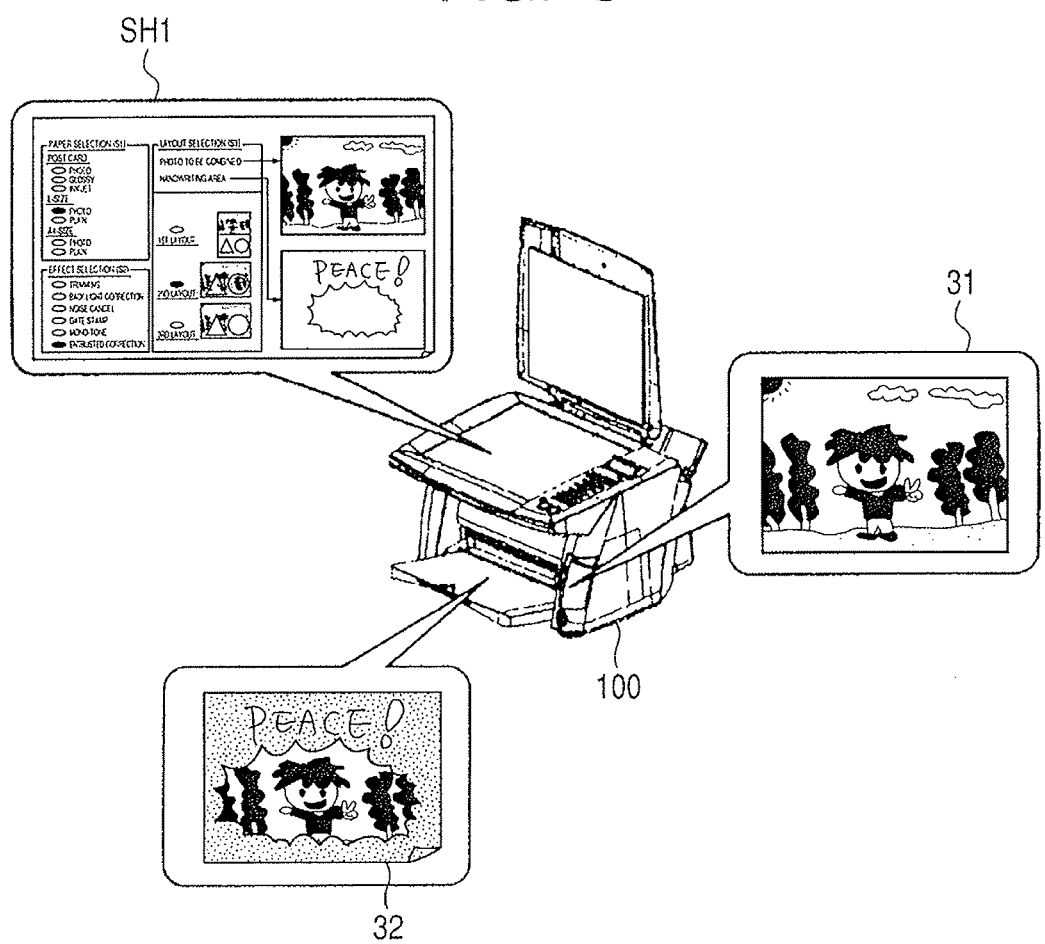
FIG. 3 is a diagram showing an outline of the operation of an embodiment.

FIG. 3 is a diagram showing the outline of the operation of the embodiment.

It is an object of the embodiment to simultaneously instruct and execute a composition of characters and an illustration and a trimming in a composite print function by the sheet scan.

In FIG. 3, SH1 denotes a composite print instruction sheet; 31 memory card image data; and 32 a result of trimming composite print.

Figure 6:
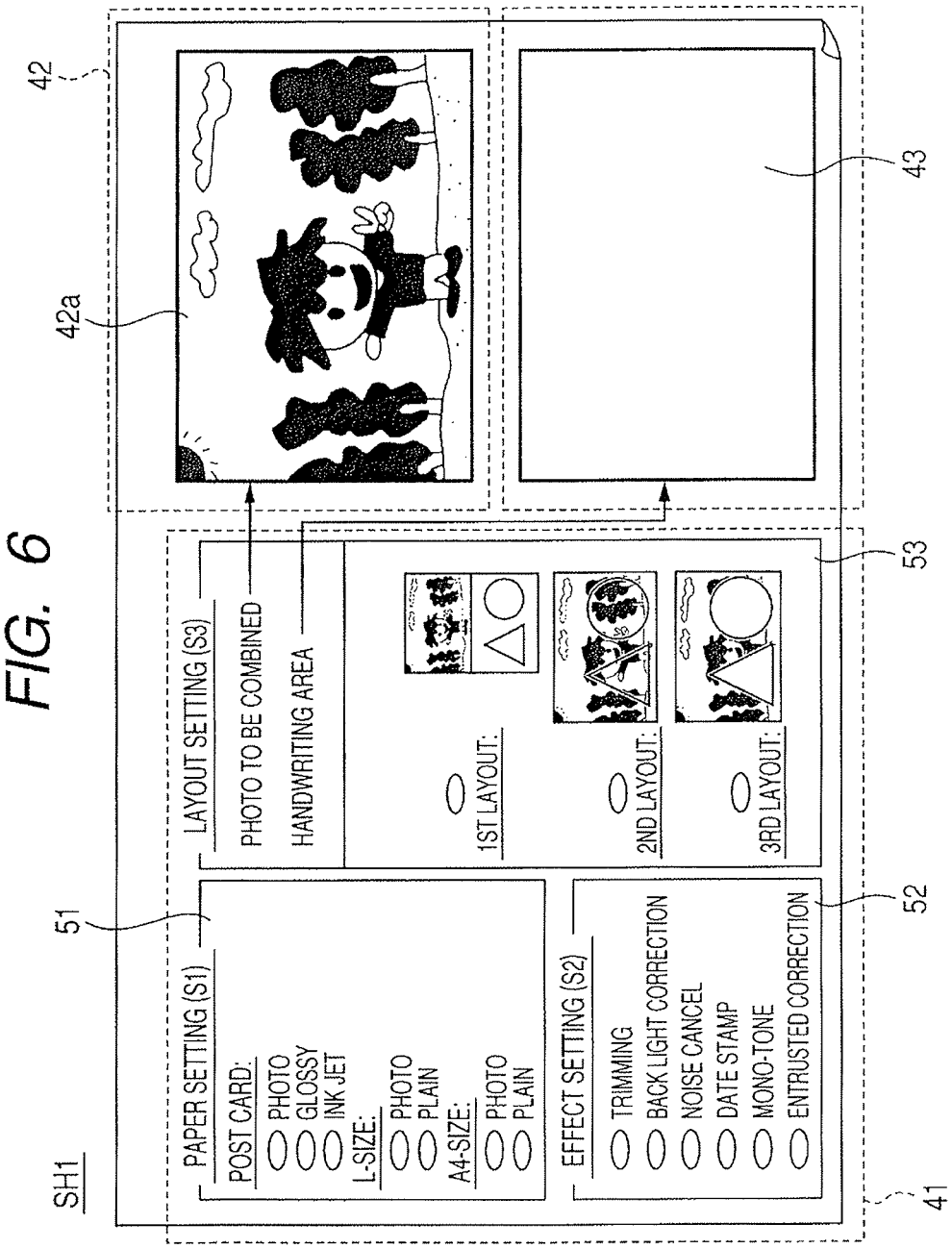
FIG. 6 is a diagram schematically showing the contents of a composite print instruction sheet SH1 which is printed by the MFP 100.

As shown in FIG. 6, the composite print instruction sheet SH1 is a sheet having: a print instructing field 41 to instruct the recording unit 5 to print; a composite image area 42; and a composition instructing field 43 to combine the image data stored in the memory and a predetermined handwritten image.

Processes which are executed until the result of trimming composite print is obtained will now be described.

Figure 4:
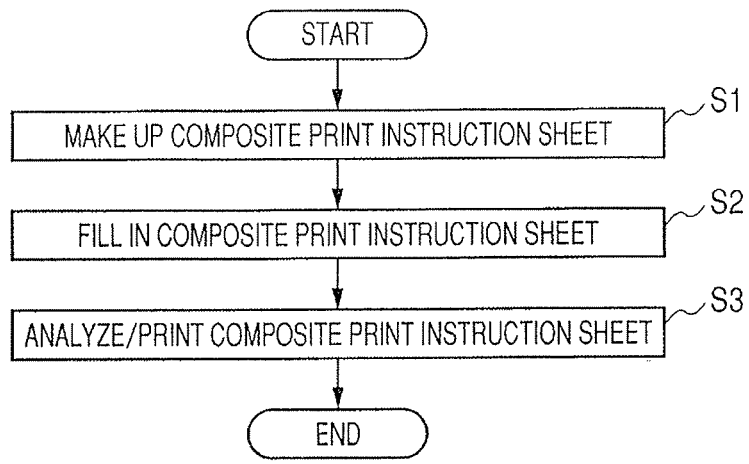
FIG. 4 is a flowchart showing an outline of the whole processing steps in a range from the start of a process of a sheet scan composite print to the end of the process.

FIG. 4 is a flowchart showing an outline of the whole processing steps in a range from the start of a process of a sheet scan composite print to the end of the process in the embodiment.

The sheet scan composite printing process is mainly classified into the following three steps: that is, make-up of the composite print instruction sheet (S1); fill-in of the composite print instruction sheet (S2); and analyze/print of the composite print instruction sheet (S3).

<Explanation of Make-Up of the Composite Print Instruction Sheet (S1)>

First, the MFP 100 makes the composite print instruction sheet for executing the sheet scan composite print.

Figure 5:
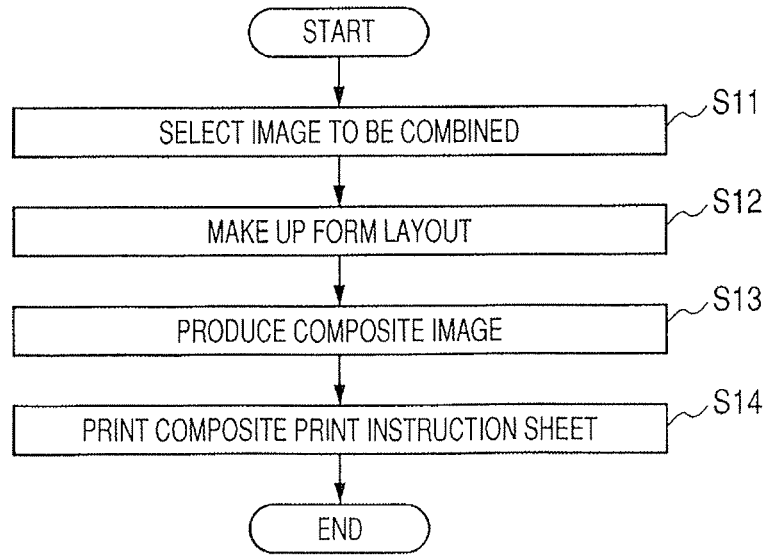
FIG. 5 is a flowchart showing a procedure for making a composite print instruction sheet.

FIG. 5 is a flowchart showing a procedure for making the composite print instruction sheet in the embodiment.

First, in step S11, the image data to be combined is selected. The data of a composite image serving as an object is designated and decided through the operation unit 2 and the display unit 1 for predetermined image stored in a memory card connected to the card I/F. In S11, by designating the data of the composite image, a storage destination of the data of the composite image can be printed as identification information such as a bar code or the like onto the composite print instruction sheet. Since the storage destination of the data of the composite image is printed onto the composite print instruction sheet, the data of the composite image can be automatically selected when the sheet is analyzed later.

Timing for selecting the data of the composite image is not limited in the embodiment. Although the embodiment has a specification in which the composite image is selected at the timing of S11, for example, it is also possible to use a specification in which the processing step of S11 is omitted and the selection of the composite image is executed later at the time of reading when the composite print instruction sheet.

A format of the data of the composite image is not limited in the embodiment. The embodiment has a specification in which the image files in the memory card connected to the card I/F are selected as candidates of the data of the composite image. For example, it is also possible to use a specification in which the image data produced by reading the original from the reading unit 4 is used as data of the composite image.

Subsequently, in S12, a form layout is made. The "form layout" is a layout of the composite print instruction sheet SH1, which will be explained hereinlater in FIG. 6. As for the form layout, for example, the data recorded in the ROM 11 in a predetermined format is developed as image data into the RAM 12 by the CPU 10.

Subsequently, the data of the composite image selected in S11 is arranged into a predetermined area of the form layout and a composite image is produced in S13. For example, the data of the composite image designated in S11 is overwritten to the designated data area of the form layout developed in the RAM 12.

Since the selecting timing of the composite image is not limited in the embodiment as mentioned above, for example, in the specification in which the processing step of S11 is omitted, the process of S13 for allowing the composite image to be included in the layout can be omitted.

Subsequently, the composite print instruction sheet SH1 is printed in S14. In the embodiment, the recording unit 5 of the MFP 100 converts the composite print instruction sheet SH1 into the printable print file for an RAW image (each of the RGB images consists of 8 bits) corresponding to the layout which has previously been formed in the RAM 12 in the recording apparatus in S12 and S13.

As mentioned above, the composite print instruction sheet SH1 which is used for the user to instruct the trimming or the composition of the characters/illustration is printed by the MFP 100 in accordance with the operations shown in steps of S11 to S14 as mentioned above.

The layout of the composite print instruction sheet SH1 will now be described.

FIG. 6 is a diagram schematically showing the contents of the composite print instruction sheet SH1 which is printed by the MFP 100 in the embodiment.

The composite print instruction sheet SH1 is a printed matter arranged onto recording paper of, for example, the A4 size. In the embodiment, the objects which are instructed by the composite print instruction sheet SH1 are mainly classified into the following two instructions: a print control instruction regarding print control; and a composition instruction regarding a combining process of the handwritten image.

In the embodiment, the print control instruction is arranged in the print instructing field 41. Since the print setting which is instructed here depends on the specification of a print unit of the MFP 100, a mark sheet system suitable for a method whereby the user selects a desired setting from the given selection items is used. Specifically speaking, for example, setting items regarding the setting items of the recording paper are provided as items of a paper setting (S1) written in a paper setting area 51 in the print instructing field 41.

The embodiment uses a specification in which one of the post card size, L-size, and A4-size can be selected. Further, the embodiment uses a specification in which either plain paper or a photo-paper (paper only for use of a photo-print) can be selected as a media type of the recording paper.

Selection items regarding an effecting process of the image to be printed are provided as items of an effect setting (S2) written in an effect setting area 52. The embodiment uses a specification in which the trimming as a principal object of the embodiment can be selected and one of the back light correction, noise cancellation, date stamp, mono-tone, and entrusted correction can be selected as another process.

Further, selection items regarding a layout of the print result obtained by showing and describing a finishing state after the handwritten image has been combined and printed are provided as items of a layout setting (S3) written in a layout setting area 53.

Figure 7:
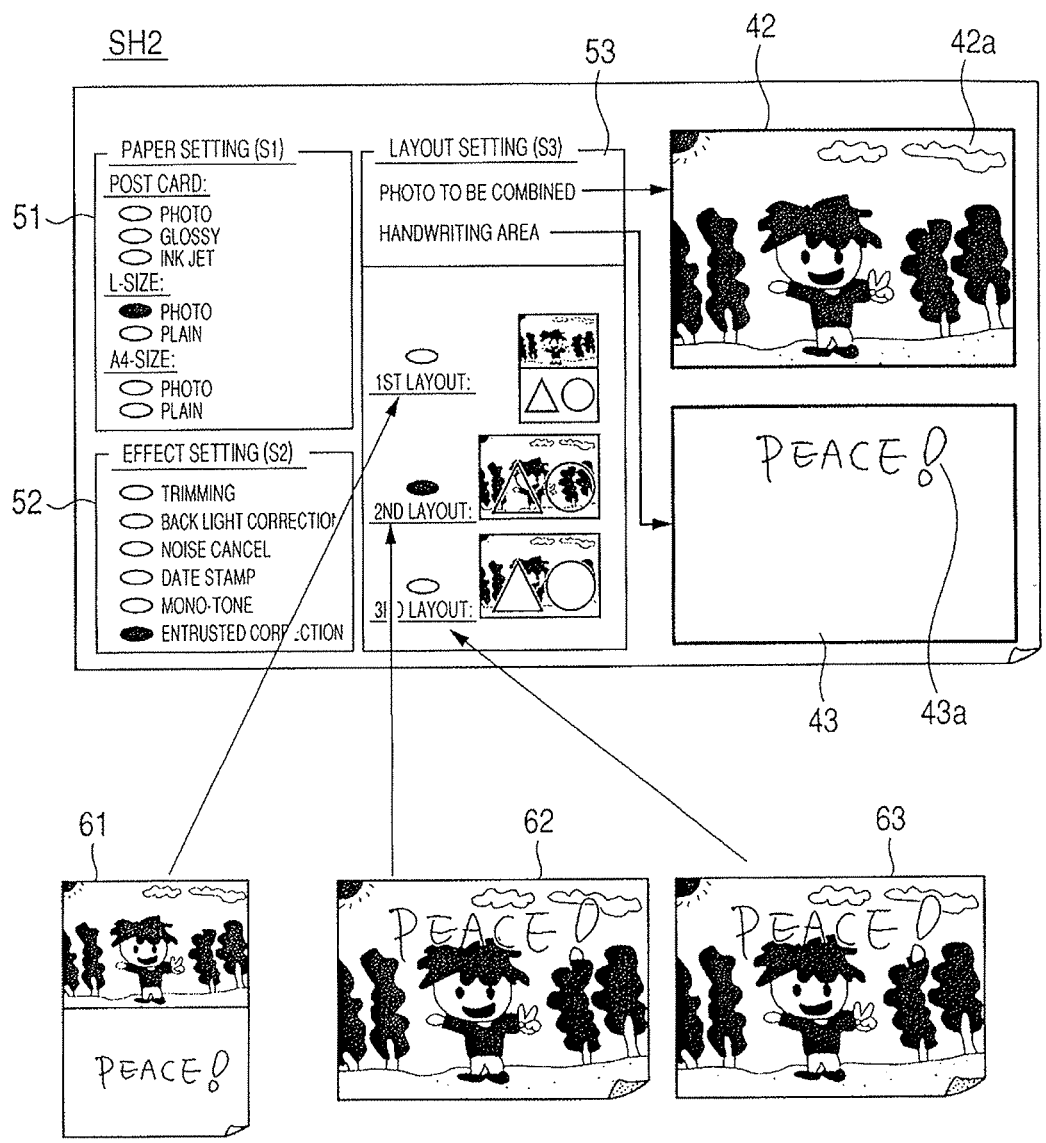
FIG. 7 is a diagram showing outlines of a fill-in example in which the composite print instruction sheet is filled in a composite print instruction sheet SH2 where the trimming is not instructed and an output result of such a sheet.

In the embodiment, the user can select one of the following three layouts: a first layout in which the composite image and the handwritten image are vertically separated; a second layout in which the composite image and the handwritten image are combined; and a third layout in which the composite image and the handwritten image are combined and the inside of the closed area in the handwritten image is painted in white. As an example of the "third layout in which the inside of the closed area in the handwritten image is painted in white" as mentioned above, there is a layout in which the inside areas of "!" in a print result 63 of the third layout in FIG. 7 are painted in white.

A composite image 42 is written in the composite image area 42. In the embodiment, the contents of the print instruction which is set in the composite image area 42 are not limited. For example, the paper setting, effect setting, and layout setting can be replaced by setting contents other than those shown in the embodiment or may be deleted from the specification.

In the embodiment, instructing means of the composite print instruction sheet SH1 is not limited. For example, in the print instructing field of the composite print instruction sheet SH1, the print control instruction from predetermined numerical values or the like written by the user can be also discriminated by, for example, an OCR analyzing system in place of the mark sheet system.

Further, in the embodiment, a user interface for instructing a print control command is not limited. For example, although the user interface for the print instruction is provided by the composite print instruction sheet SH1 in the embodiment, it can be also provided by a key input of the MFP 100. Further, it is not always necessary to issue the print instruction in the MFP 100 apparatus. For example, the print instruction command can be also issued by a digital camera or the like connected by a USB interface.

In the embodiment, however, it is necessary that the selection item to decide whether or not the trimming is executed is included in the print instruction command.

The composite image area 42 is a composite image area where the composite image to be combined is arranged. When the user handwrites the composite image into the composition instructing field 43, the composite image which is arranged in the composite image area 42 is used as a clue for recognizing the composite positional relation where the composite image and the handwritten image are combined.

As mentioned above, since the presence or absence of the composite image area 42 is not limited in the embodiment, for example, a composite print instruction sheet in which the composite image area 42 is not arranged may be used in place of the composite print instruction sheet SH1.

The composition instructing field 43 is an area where the illustration/characters which the user wants to combine or a trimming area where he wants to trim are written.

By processing the layout shown in FIG. 6 in accordance with the flowchart shown in FIG. 5, the procedure for <make-up of the composite print instruction sheet (S1)> is completed.

<Explanation of Fill-in of the Composite Print Instruction Sheet (S2)>

The fill-in operation by the user is executed to the composite print instruction sheet SH1 made in the make-up of the composite print instruction sheet (S1).

Although a user's fill-in method to the composite print instruction sheet SH1 is not limited in the embodiment, explanation will be continued in the embodiment on the assumption that the user has filled in as shown in an example of FIG. 6 or 7.

FIG. 7 is a diagram showing outlines of a fill-in example in which the composite print instruction sheet is filled in the composite print instruction sheet SH2 where the trimming is not instructed and an output result of such a sheet.

A handwritten image 43a has been written in the composition instructing field 43 in order to combine handwritten characters "PEACE!" with the composite image.

A print result 61 of the first layout is a print result which is obtained when the composite print has been executed in the state instructed in the paper setting area 51 and in the state where the first layout has been selected.

A print result 62 of the second layout is a print result which is obtained when the composite print has been executed in the state instructed in the effect setting area 52 and in the state where the second layout has been selected.

A print result 63 of the third layout is a print result which is obtained when the composite print has been executed in the state instructed in the composition instructing field 43 and in the state where the third layout has been selected.

The first layout is a layout for displaying the composite image to the upper position and displaying the handwritten image to the lower position. The print result shown in the print result 61 of the first layout is obtained.

The second layout is a layout in which the composite image and the handwritten image are combined in the same area. The print result shown in the print result 62 of the second layout is obtained.

The third layout instructs a layout in which the composite image and the handwritten image are combined in the same area in a manner similar to the print result 62 of the second layout. The third layout also instructs a layout in which the closed area of the handwritten image is painted in white. The print result shown in the print result 63 of the third layout is obtained. The "closed area of the handwritten image" indicates the closed area portions of "P", "A", and "!" mark of "PEACE!" in the composition instructing field 43. In the case where "!" has been handwritten, the inside of an outline forming the mark "!" is a closed area.

Although there are not white-on-black portions in the closed areas in the print result 62 of the second layout, there are white-on-black portions in the print result 63 of the third layout.

In the example shown in FIG. 7, the trimming is not instructed in the effect setting (S2) but the entrusted correction is instructed. The "entrusted correction" is a correction in which the image processing unit 14 of the MFP 100 automatically and properly makes the image correction.

As mentioned above, the trimming is not performed in the print result 63 of the third layout. In the embodiment, when the trimming is instructed, while the outside is set to a white-on-black portion, the inside of the normal characters/illustration is set to a white-on-black portion.

In the case of simultaneously executing the composition of the handwritten image and the trimming by using the composite print instruction sheet SH3 in the embodiment, its fill-in example and print result will now be described.

Figure 8:
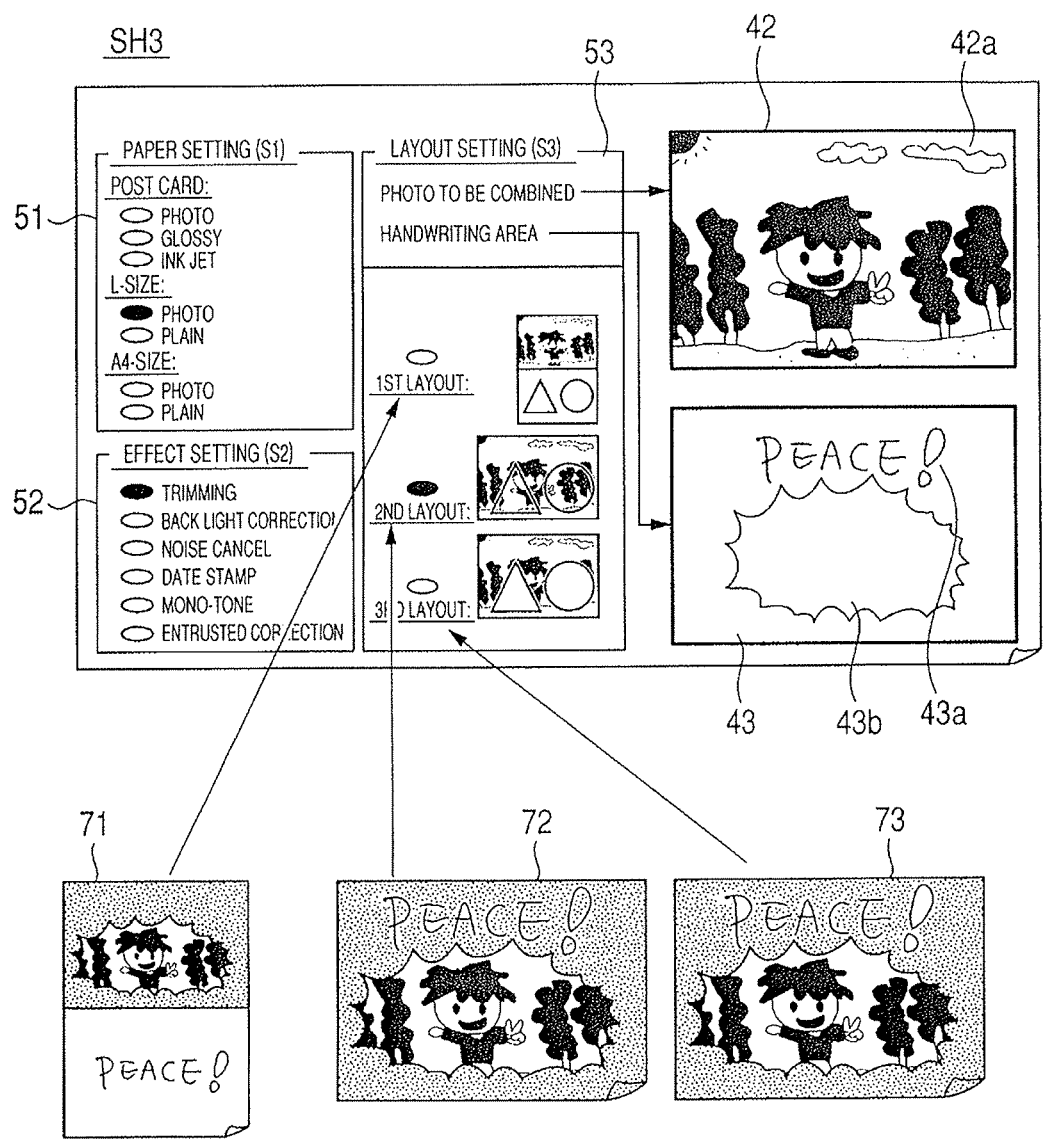
FIG. 8 is a diagram showing outlines of a fill-in example in which the composite print instruction sheet is filled in a composite print instruction sheet SH3 where the trimming has been instructed and an output result of such a sheet.

FIG. 8 is a diagram showing outlines of a fill-in example in which the composite print instruction sheet is filled in the composite print instruction sheet SH3 where the trimming has been instructed and an output result of such a sheet.

Accurately speaking, since an output process is unprocessed at the processing stage of S2, the output results for the fill-in examples of the composite print instruction sheets SH2 and SH3 shown in FIGS. 7 and 8 are not obtained. However, in the outlines of the output results as shown in FIGS. 7 and 8, the output results are also shown in order to easily explain an effect of the fill-in examples.

The composite print instruction sheet SH3 is a filled-in composite print instruction sheet. In the paper setting area 51, a mark column of "photo-paper (paper only for use of the photo-print) of the L-size" has been painted in order to select the item of "paper setting (S1)".

A mark column of "trimming" has been painted in the effect setting area 52.

The handwritten image 43a has been written in the layout setting area 53 in order to combine the handwritten characters "PEACE!" to the composite image 42a. A handwritten image 43b has been written in the layout setting area 53 in order to instruct the trimming selected in the effect setting area 52.

A print result 71 of the first layout is a print result which is obtained when the composite print has been executed in the state where the paper setting area 51 has been instructed and in the state where the first layout has been selected.

A print result 72 of the second layout is a print result which is obtained when the composite print has been executed in the state where the effect setting area 52 has been instructed and in the state where the second layout has been selected.

A print result 73 of the third layout is a print result which is obtained when the composite print has been executed in the state where the layout setting area 53 has been instructed and in the state where the third layout has been selected.

When the first layout is selected, a layout in which the composite image is displayed to the upper position and the handwritten image is displayed to the lower position is instructed and the print result shown in the print result 71 of the first layout is obtained. Moreover, since the trimming is instructed in the effect setting area 52, the composite image 42a is trimmed in accordance with a trimming frame which has been handwritten in the composition instructing field 43 and the print result 71 of the first layout is obtained.

When the second layout is selected, a layout in which the composite image and the handwritten image are combined in the same area is instructed and the print result shown in the print result 72 of the second layout is obtained. Moreover, since the trimming is instructed in the effect setting area 52, the composite image 42a is trimmed in accordance with the trimming frame which has been handwritten in the composition instructing field 43 and the print result 72 of the second layout is obtained.

When the third layout is selected, a layout in which the composite image and the handwritten image are combined in the same area in a manner similar to the print result 72 of the second layout is instructed. Moreover, a layout in which the closed areas in the handwritten image are painted in white is also instructed and the print result shown in the print result 73 of the third layout is obtained. The closed areas in the image mentioned above are found in the portion of "PEACE" and in the closed area portions of the "!" mark in the layout setting area 53.

Furthermore, since the trimming is instructed in the effect setting area 52, the composite image 42a is trimmed in accordance with the trimming frame which has been handwritten in the composition instructing field 43 and the print result 73 of the third layout is obtained.

In FIG. 8, the outside of the trimmed area is displayed as a mesh area in order to show the effect of the trimming with easy understanding. In the embodiment, an undercolor of the trimmed area is not limited.

As mentioned above, the user writes the composite print instruction sheets SH2 and SH3 as shown in the fill-in examples of FIGS. 7 and 8.

In the embodiment, explanation of the composite print instruction sheet fill-in (S2) will be made hereinafter on the assumption that the trimming is also instructed to the composite print instruction sheet SH3 as shown in FIG. 8.

<Explanation of Analyze/Print of the Composite Print Instruction Sheet (S3)>

Processes in which the MFP 100 analyzes the filled-in composite print instruction sheet SH3 according to the fill-in example shown in FIG. 8 and composite-prints it in accordance with the analyzed contents in S3 will now be described.

Figure 9:
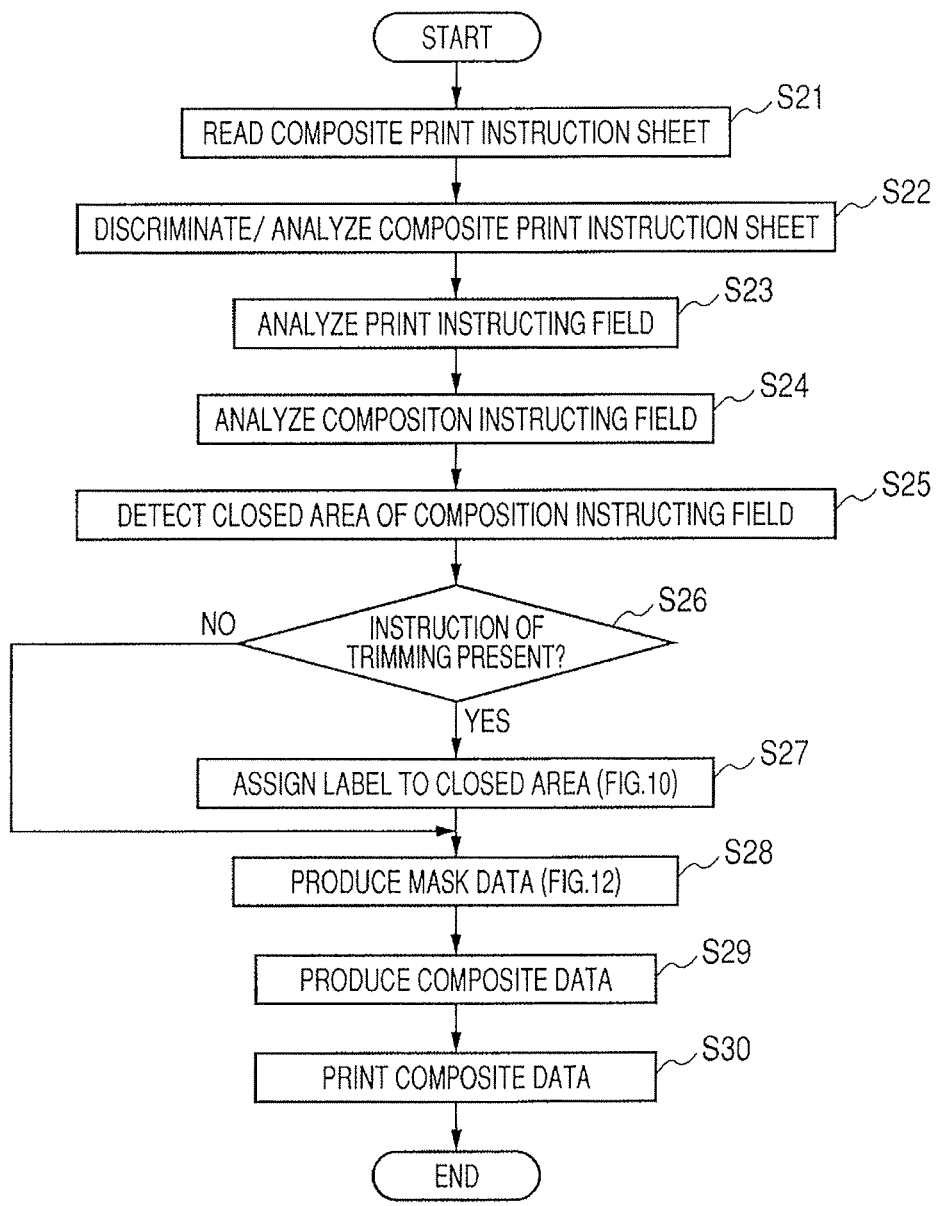
FIG. 9 is a whole flowchart showing a series of processing procedures in a range from an analysis of the composite print instruction sheet SH3 to its composite print.

FIG. 9 is a whole flowchart showing a series of processing procedures in a range from the analysis of the composite print instruction sheet SH3 to its composite print.

First, the composite print instruction sheet SH3 is read in S21. In the embodiment, the detailed reading operation of the composite print instruction sheet SH3 is not limited. For example, it can be also read as color data of RGB each consisting of 8 bits and stored into a predetermined reading image memory at a necessary resolution enough to analyze the mark sheet.

Subsequently, the composite print instruction sheet SH3 is discriminated and analyzed in S22. In the embodiment, the method of discriminating whether or not the read image is the composite print instruction sheet SH3 is not limited. For example, whether or not the read image is the composite print instruction sheet SH3 can be also discriminated on the basis of a result of a discrimination about whether or not a predetermined feature point(s) (characteristic pixel(s)) that is/are peculiar to the composite print instruction sheet SH3 can be detected from the image stored in the image memory.

The print instructing field is subsequently analyzed in S23. In the embodiment, the analyzing method of the print instructing field is not limited. For example, since the mark sheet system is used for the print instructing field, whether or not the mark has been painted is discriminated on the basis of the number of pixels each having a predetermined concentration or more which were detected in a marked area of predetermined coordinates.

Subsequently, the composition instructing field is analyzed in S24. In the embodiment, the analyzing method of the composition instructing field is not limited. For example, processes in which only the image data in the composition instructing field is analyzed and extracted from the whole composite print instruction sheet SH3 are executed. For example, only the composition instructing field 43 may be read again in a color mode of a high resolution.

Subsequently, the closed areas of the handwritten images 43a and 43b in the composition instructing field 43 analyzed in S24 are detected in S25.

In the embodiment, a detecting algorithm of the closed areas is not limited. For example, the data of the handwritten images in the composition instructing field 43 is binarized into provisional black and white pixels. Whether each of the provisional binary pixels is black or white is discriminated from four directions of the binarized composition instructing field 43 toward the center. If the target pixel is the provisional white pixel, such a pixel is formally masked as a white pixel. If at least one provisional black pixel exists in a predetermined direction during the discriminating process, the discriminating process in such a direction is stopped there.

After completion of the discriminating processes in the four directions, all of the pixels which are not masked in white are analyzed. If at least one white-masked pixel exists in the four directions of the pixels, such a pixel is also similarly masked in white.

Finally, all of the pixels which are not masked in white are masked in black.

It is also possible to detect the closed areas by defining in such a manner that a block of the area which is not masked in white by the above-mentioned painting method is a closed area of the black mask.

Subsequently, whether or not the trimming instruction exists in the print instructing field 41 analyzed in S23 is discriminated in S26. If the trimming instruction does not exist in the print instructing field 41 (in more detail, layout setting area 53), a mask data producing process of S28 is executed on the assumption that the image to be trimmed does not exist. If the trimming instruction exists in the print instructing field, an attribute is assigned in S27 on the assumption that the image to be trimmed exists in the composition instructing field 43.

The process shown in S27 for assigning the attribute to the closed area will now be described in detail.

Figure 10:
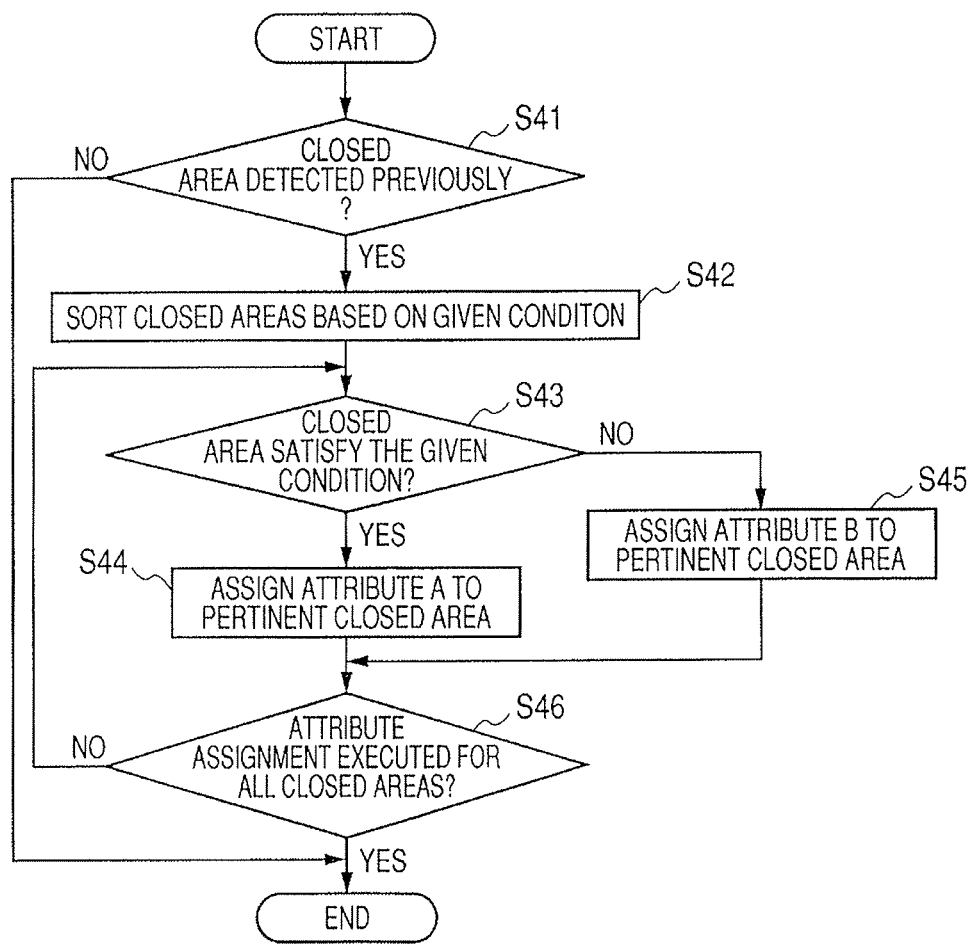
FIG. 10 is a flowchart showing a process for assigning an attribute to a closed area in a composition instructing field 43.

FIG. 10 is a flowchart showing the process for assigning the label to the closed area in the composition instructing field 43.

First, whether or not the closed areas have already been detected is discriminated in S41. If it is decided here that no closed areas are detected, even if the print trimming instruction was detected in S26 in FIG. 9, the trimming cannot be performed, so that the attribute assigning process is finished.

If it is determined in S41 that the closed areas have been detected, subsequently, the closed areas are sorted on the basis of a given condition as a reference and each closed area is numbered. In the embodiment, the closed areas are sorted in order of areas of them.

After completion of the shorting of the closed areas, a process for sequentially assigning the attributes to the sorted closed areas is executed in S42. Therefore, first, whether or not a certain closed area satisfies the given condition is discriminated in S43. In the embodiment, the given condition is not specified. Since it is an object of the embodiment that the closed areas for trimming are distinguished from the other closed areas, the given condition is defined to be "the closed area having the largest area". If the embodiment has a specification in which the trimming is executed to a plurality of areas, it is also possible to define the given condition so as to be "the closed area having a predetermined area or more".

If the closed area to be discriminated satisfies the given condition in S43, an attribute (A) is defined (attribute A is assigned) to the pertinent closed area in S44. If the closed area to be discriminated does not satisfy the given condition in S43, an attribute (B) is defined to the pertinent closed area in S45.

A condition "the closed area having a predetermined area or less" may be set as a given condition of S43. By defining in this manner, it is also possible to construct in such a manner that a new attribute (C) which is pertinent to such a condition is defined, the closed area of the attribute (C) is a closed area having a very small area, is regarded as a dust or noise upon reading, and can be ignored.

The attribute assigning process is executed with respect to all of the detected closed areas. If it is confirmed in S46 that the attributes have been defined with respect to all of the closed areas, a series of the attribute assigning processes of the closed areas shown in FIG. 10 is finished.

Since the explanation of the attribute assigning process has been made above in this manner, explanation will be returned to the flowchart shown in FIG. 9. After completion of assigning the attribute in S27 described in FIG. 10, the mask data producing process is executed in S28.

First, the mask data will be explained. The "mask data" is produced on the basis of the read image data and used to decide how to combine the composite image and the handwritten image.

Figure 11A:
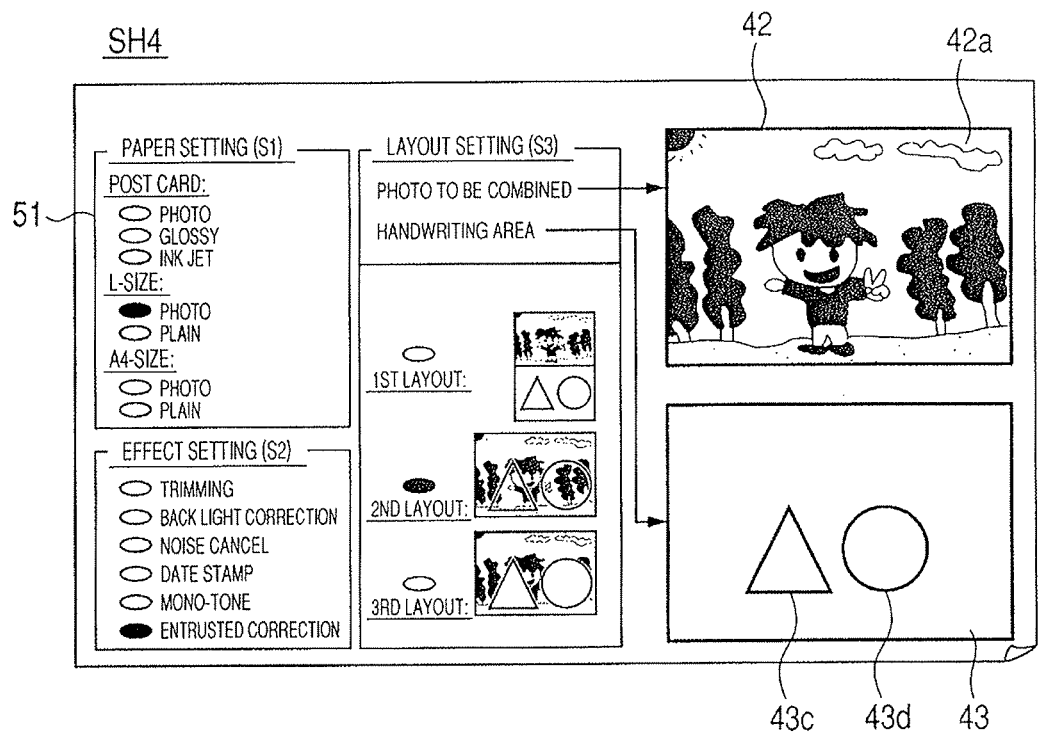
FIGS. 11A and 11B are schematic diagrams showing functions of mask data.
Figure 11B:
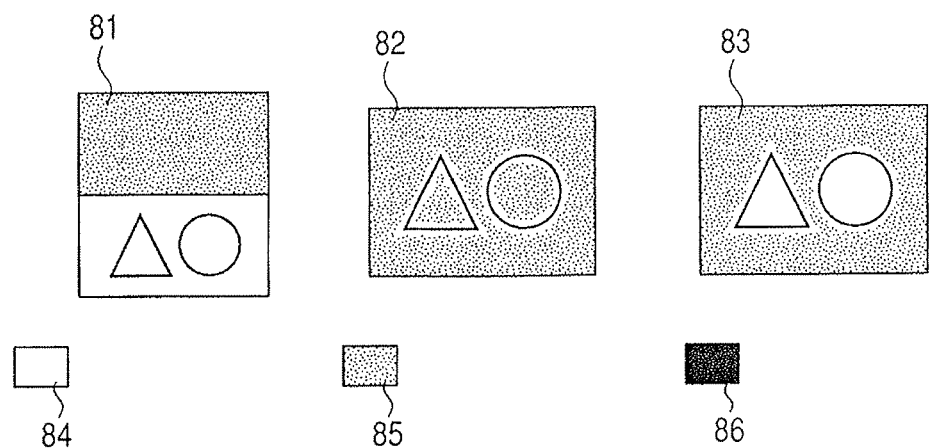

FIGS. 11A and 11B are schematic diagrams showing functions of the mask data in the embodiment.

A filled-in composite print instruction sheet SH4 is a filled-in composite print instruction sheet shown as an example to explain the mask data. A handwritten image 43c of "Δ" and a handwritten image 43d of "o" are written in the composition instructing field 43.

Mask data 81 of the first layout is mask data which satisfies the above given condition and is produced when the first layout is selected.

Mask data 82 of the second layout is mask data which satisfies the above given condition and is produced when the second layout is selected.

Mask data 83 of the third layout is mask data which satisfies the above given condition and is produced when the third layout is selected.

The mask data is used for the process to combine with the composite image 42a on the basis of the handwritten images 43c and 43d.

For example, each of the mask data 81, 82, and 83 has a predetermined role every pixel constructing the mask data. That is, with respect to the mask data 81 of the first layout, the mask data 82 of the second layout, and the mask data 83 of the third layout, a mask pixel 84 is used to paint a color which has previously been designated, with respect to the pixel of the composite image of the same coordinates. The "pixel of the composite image of the same coordinates" is a pixel in which the coordinates of the composite image and those of the handwritten image are identical.

Similarly, a mask pixel 85 is used to execute no process, with respect to the pixel of the composite image of the same coordinates. That is, the pixel of the composite image is left as it is.

Similarly, a mask pixel 86 is used to paint to execute the color of the handwritten image, with respect to the pixel of the composite image of the same coordinates.

Therefore, as for the mask data 81 of the first layout, since the composite image is arranged as it is to the upper half portion of the print layout, the mask pixel 85 is assigned to the pixel of the upper half portion of the mask data. Since the handwritten images of "Δ" and "o" are arranged as they are to the lower half portion in the print layout, the mask pixel 86 is assigned there. With respect to other pixels, since the composite image is arranged, the mask pixel 85 is assigned.

Similarly, as for the mask data 82 of the second layout, since the handwritten image 43*c* of "Δ", the handwritten image 43*d* of "o", and the composite image 42*a* are combined to the same layout, the mask pixel 86 is assigned to the handwritten image 43*c* of "Δ" and the handwritten image 43*d* of "o". That is, in the case of combining the outlines of "Δ" and "o" with an image photographed by a digital camera, since the outlines of "Δ" and "o" are portions handwritten by the user, it is necessary to set "Δ" and "o" to a layer higher than that of the composite image. Therefore, the handwritten image 43*c* of "Δ" and the handwritten image 43*d* of "o" are handled as mask pixels.

With respect to the adjacent pixels existing in a predetermined range from the pixels of the handwritten images, the mask pixel 84 is assigned in order to provide the trimming effect. With respect to the other pixels, the mask pixel 85 is assigned to arrange the composite image 42*a*.

In the third layout, since the instruction to paint out the inside of the closed area is included, the mask pixel 84 is also assigned with respect to the inside of each of the closed areas of "Δ" and "o". With respect to the other pixels, the mask pixel 85 is assigned to arrange the composite image 42*a*.

In the embodiment, a method of matching the coordinates of the mask data with those of the composite image is not limited. In other words, for example, if an aspect ratio of the composite image and that of the handwritten image differ, those coordinates do not always correspond in a one-to-one relational manner. It is, therefore, necessary to relatively convert the coordinates. That is, in the embodiment, the mask data is variable-magnified so as to match the aspect ratio of the handwritten image with a predetermined aspect ratio of the composite image. The converting method in this instance is not limited.

As mentioned above, in the embodiment, the composite print is realized by a method whereby the mask data, the composite image 42*a*, and the handwritten images 43*c* and 43*d* explained in FIGS. 11A and 11B are combined in the image memory.

Figure 12:
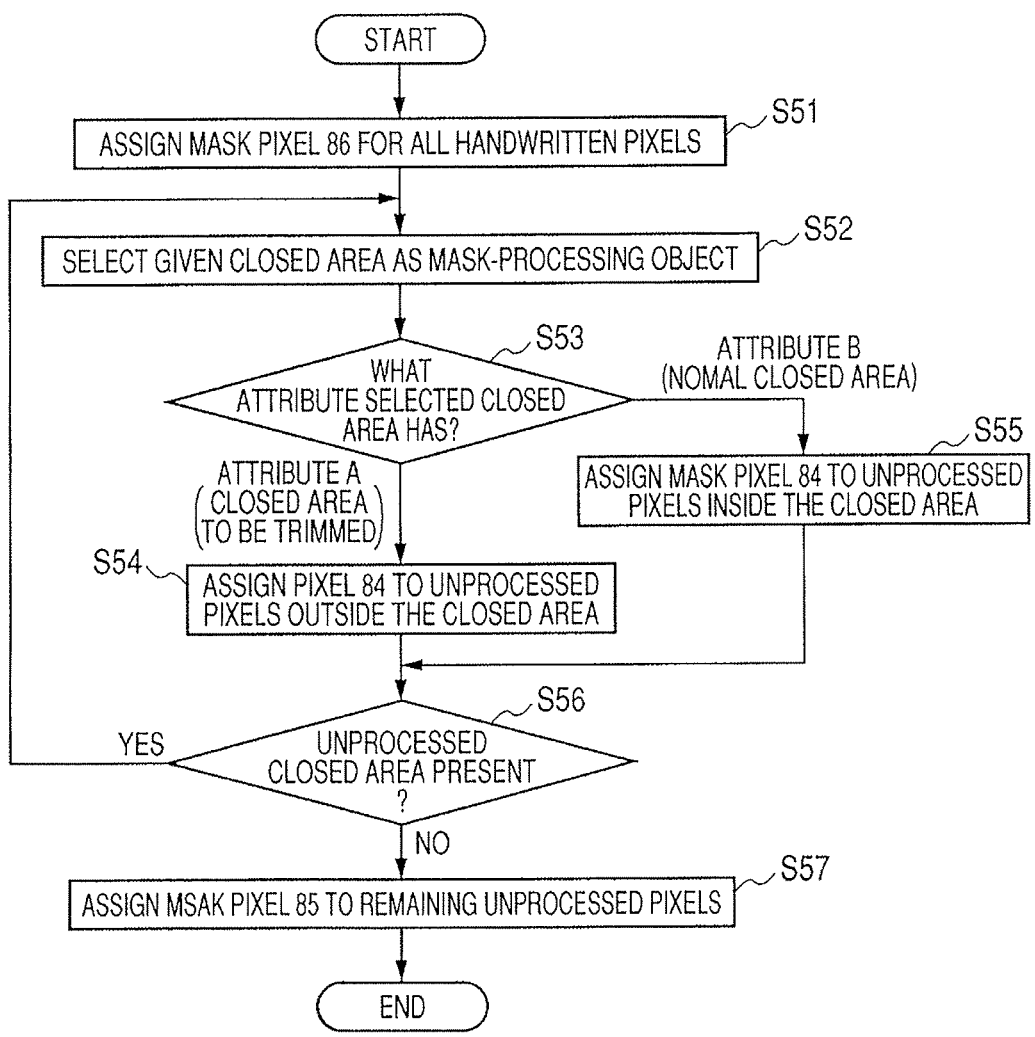
FIG. 12 is a flowchart showing the detailed operation for producing the mask data.

FIG. 12 is a flowchart showing the detailed operation for producing the mask data in the embodiment.

The masking process is executed to all of the image data in the composition instructing field 43 shown in FIG. 6.

First, the mask pixel 86 is assigned to all of the pixels handwritten in the composition instructing field 43 (all of the pixels in all of the handwritten images) in S51. In the embodiment, a method of discriminating the pixels of the handwritten images and the pixels which are not handwritten is not limited. For example, it is also possible to determine that the pixels of which the concentration is higher than a predetermined threshold value are the pixels of the handwritten image. It is also possible to execute a process so that an isolated point (point of a few dots around which the pixels of the handwritten image do not exist) is regarded as a noise and it is not regarded as a pixel of an image not handwritten.

Subsequently, a given closed area is selected as a mask-processing object and an attention is paid to such closed area in S52. An attribute of this closed area is discriminated in S53. In the embodiment, either the attribute (A) or the attribute (B) is assigned to the closed area by assigning attribute described in FIG. 10.

If it is determined in S53 that the target closed area has the attribute (A), since this closed area is a closed area for the trimming instruction, the masking process to perform the trimming composition is executed. Specifically speaking, the mask pixel 84 is assigned to all of the unprocessed pixels which exist in the outside of the pertinent closed area and which are not masking-processed in S54.

According to this masking process, since the pixels masked in a predetermined color are overwritten to the composite image 42*a*, the trimming effect can be obtained as a result by color-masking the outside of the closed area.

Such a mask pixel is assigned only to the unprocessed pixels. Therefore, since the process has already been executed to the pixels of the handwritten image in S51, even if the handwritten image exists out of the closed area for trimming, it is combined with the composite image 42*a* without being erased.

Subsequently, if it is determined in S53 that the target closed area has the attribute (B), since this closed area is a closed area where the trimming is not executed, the mask pixel 84 is assigned to the pixels which are included in a predetermined width of the inside of the closed area and which are the unprocessed pixels in S55.

In the embodiment, the width of the inside of the closed area where the mask pixel is assigned in S55 is not limited. For example, in the embodiment, in the case of producing the mask data of the second layout described in the mask data 82 of the second layout in FIGS. 11A and 11B, it is sufficient to assign the mask pixel 84 to the unprocessed pixels included in a range that is inside by a few pixels from the closed area.

In the case of producing the mask data 83 of the third layout shown in FIGS. 11A and 11B, it is sufficient to assign the mask pixel 84 to all of the unprocessed pixels existing in the inside of the closed area.

In dependence on the layout, it is also possible to assign the mask pixel 84 to the unprocessed pixels existing in a range of a few pixels in the outside of the closed area in order to provide the trimming effect of the characters/illustration. A process similar to that mentioned above can be also executed to the pixels of the handwritten image.

When the process is executed in either S54 or S55, whether or not the unprocessed closed areas exist is subsequently discriminated in S56. The processes of S52 to S54 or S55 are repeated to all of the closed areas.

If it is determined that the processes for all of the closed areas have been completed in S56, finally, the mask pixel 85 is assigned to all of the remaining unprocessed pixels in S57.

As mentioned above, the mask data is produced in accordance with the flowchart shown in FIG. 12 on the basis of the handwritten images which have been handwritten in the composition instructing field 43 and the instruction contents in the print instructing field.

Figure 13:
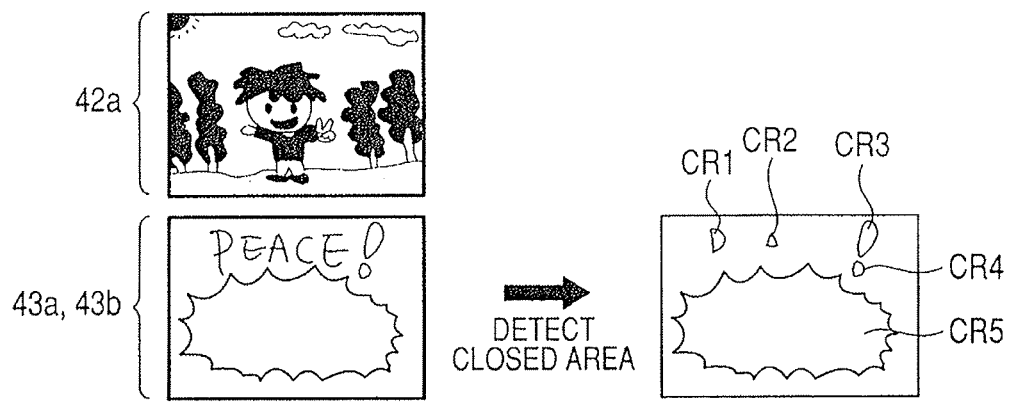
FIG. 13 is a diagram showing processes in which closed areas are detected from the composition instructing field 43 and the mask data is produced, in the state where the trimming has been instructed in accordance with assigning the attribute shown in FIG. 10 and producing the mask data producing operation shown in FIG. 12.

FIG. 13 is a diagram showing processes in which the closed areas are detected from the composition instructing field 43 and the mask data is produced in the state where the trimming as a condition of the embodiment has been instructed, in accordance with assigning the attribute shown in FIG. 10 and the mask data producing operation shown in FIG. 12.

The handwritten images 43*a* and 43*b* are images which were handwritten by the user.

As a result of the detection of the closed areas with respect to the handwritten images 43*a* and 43*b*, closed areas CR1, CR2, CR3, CR4, and CR5 are detected.

Figure 14:
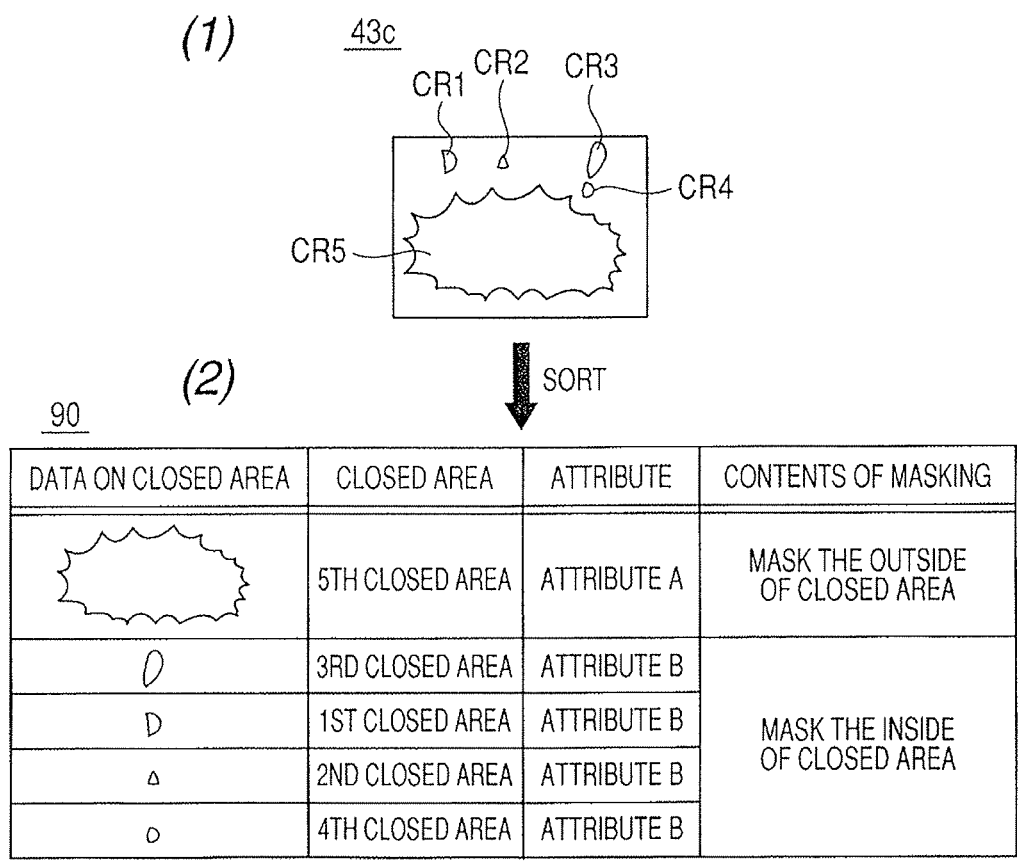
FIG. 14 is a diagram schematically showing the assigning an attribute of the detected closed areas.

FIG. 14 is a diagram schematically showing the attribute assignment of the detected closed areas.

FIG. 14(1) shows an image in which an attention is paid only to the closed areas CR1 to CR5 in the handwritten image 43*c*. When the attribute assigning process of the closed areas is executed with respect to the closed areas CR1 to CR5, the attribute (A) is assigned to the closed area CR5 of the largest area in an attribute 90 of the closed areas. The attribute (A) is an attribute showing that the trimming is executed. The attribute (B) is assigned to the other closed areas CR1 to CR4. The attribute (B) is an attribute showing that a process in which the trimming is not executed is performed.

Figure 15:
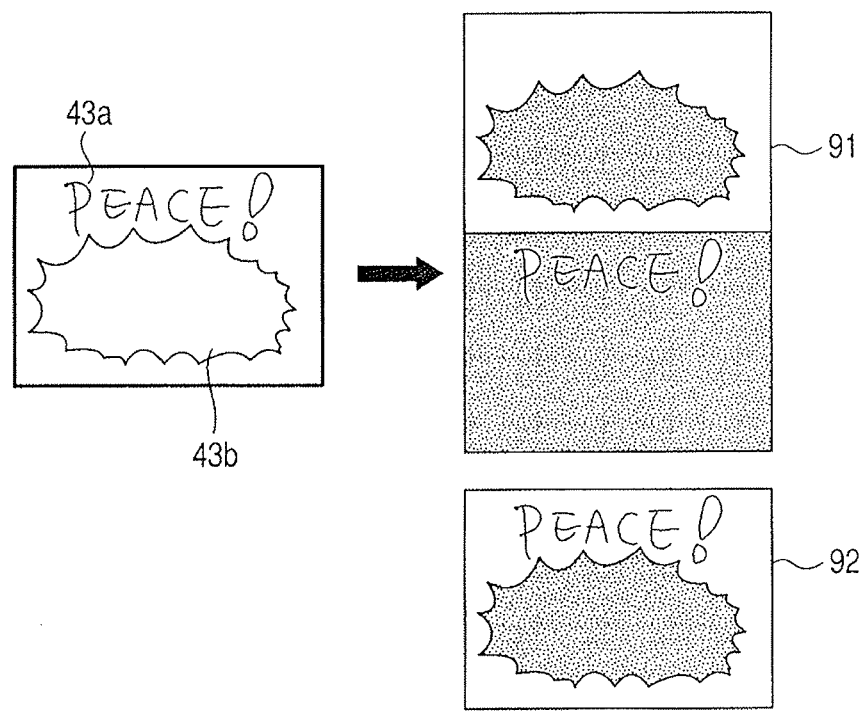
FIG. 15 is a diagram schematically showing the mask data creation.

FIG. 15 is a diagram schematically showing the mask data creation in the embodiment.

As mask data 91 of the first layout, the mask data in which the closed areas of the layout and the other areas are vertically separated is produced for the handwritten image 43a.

As mask data 92 of the second or third layout, the mask data is produced on the same layout as shown in FIG. 15. That is, since the first layout is a layout in which the composite image and the handwritten image are vertically divided (written), the composite image and the mask data do not exist on the same layout. However, according to the second layout, since the composite image and the handwritten image are arranged in the same location, the mask data is arranged on the same layout as that of the composite image.

Figure 16:
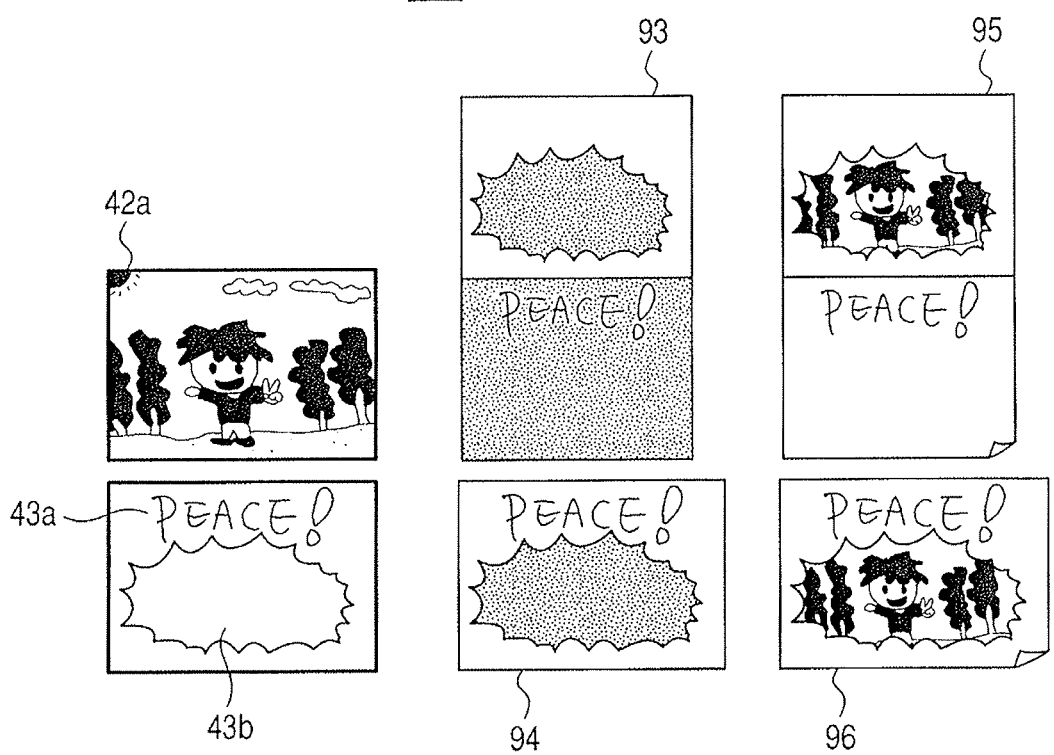
FIG. 16 is a diagram schematically showing a result of the composite print of each layout.

FIG. 16 is a diagram schematically showing a result of the composite print of each layout in the embodiment.

When the composite image 42a and the handwritten images 43a and 43b are combined while performing the trimming, a print result 95 can be obtained from mask data 93 of the first layout. Similarly, a print result 96 can be obtained from mask data 94 of the second or third layout.

Returning to the explanation of the flowchart shown in FIG. 9, the mask data produced in the flowchart (S28) shown in FIG. 12 is used for the composite data producing process (S29) in accordance with the roles of the mask pixels explained in FIGS. 11A and 11B.

When the composite data of the print format according to the specification of the print unit of the MFP 100 is produced in S29, the printing process of the composite data is executed in S30 and <analyze/print of the composite print instruction sheet (S3)> is completed.

As mentioned above, the user performs the marking of the trimming instruction to the produced composite print instruction sheet SH3, writes frame lines of the closed areas to be trimmed into the composition instructing field 43, and also writes the characters or illustration to be combined.

By reading the composite print instruction sheet SH3, the print result in which the composition of the characters or illustration according to the handwritten image and the trimming by the user have simultaneously been processed can be obtained. Such a series of operations can be realized by one composite print instruction sheet by executing the combining process to the closed areas as trimming areas in association with the trimming instruction mark.

While the present invention has been described with reference to exemplary embodiments, it is to be understood that the invention is not limited to the disclosed exemplary embodiments. The scope of the following claims is to be accorded the broadcast interpretation so as to encompass all such modifications and equivalent structures and functions.

This application claims the benefit of Japanese Patent Application No. 2005-378624, filed Dec. 28, 2005, which is hereby incorporated by reference herein in its entirety.

What is claimed is:

1. An image processing apparatus, comprising:
a print control unit configured to cause a printing apparatus to print a sheet image onto a sheet so that a user can add image information, drawn by the user and to be combined with a secondary image to generate a composite image, and instruction information, designating a process to be executed on a processing area of the images to be composited;
an acquiring unit configured to acquire a read image which is obtained by reading, by a reading apparatus, the sheet image printed by the print control unit, wherein the user drawn image information and the instruction information are included in the read image;
a determining unit configured to determine whether the image information included in the read image acquired by the acquiring unit designates the processing area, depending on whether the user drawn image information includes a predetermined type of area;
a processing unit configured to specify the processing area of the images to be composited, based on the image information included in the read image, and to execute the process on the specified processing area based on the instruction information included in the read image; and
a combining unit configured to combine the image information included in the read image and the secondary image to generate the composite image.

2. An apparatus according to claim 1, wherein said processing unit executes a trimming process on the processing area of the images to be composited.

3. An apparatus according to claim 1, wherein said processing unit fills the processing area of the images to be composited with a predetermined color.

4. An apparatus according to claim 1, wherein the predetermined type of area is a closed area shape, and if the determining unit determines that the image information added by the user on the sheet indicates a closed area, said processing unit executes the process on the specified processing area of the images to be composited corresponding to the closed area indicated by the image information.

5. An apparatus according to claim 4, wherein said processing unit executes the process corresponding to a size of the closed area, on the processing area of the images to be composited.

6. An apparatus according to claim 1, further comprising an outputting unit configured to output a composite image where the image information included in the read image and the secondary image are combined by the combining unit.

7. An apparatus according to claim 6, wherein said outputting unit outputs the composite image laid out according to a layout designated by the user.

8. An apparatus according to claim 6, wherein said outputting unit determines a sheet size designated by a user for the composite image, based on the read image acquired by the acquiring unit, and causes the printing apparatus to print the composite image according to the determined sheet size.

9. A method of controlling an image processing apparatus, comprising the steps of:
printing a sheet image onto a sheet so that a user can add image information, drawn by the user and to be combined with a secondary image to generate a composite image, and instruction information designating a process to be executed on a processing area of the images to be composited;
acquiring a read image which is obtained by reading, by a reading apparatus, the sheet image printed by the print control unit, wherein the user drawn image information and the instruction information are included in the read image;
determining whether the image information included in the acquired read image designates the processing area, depending on whether the user drawn image information includes to a predetermined type of area;
specifying the processing area of the images to be composited, based on the image information included in the read image;

executing the process on the specified processing area based on the instruction information included in the read image; and combining the image information included in the read image and the secondary image to generate the composite image.

10. A method according to claim 9, further comprising executing a trimming process on the processing area of the images to be composited.

11. A method according to claim 9, wherein the executing step fills the specified processing area of the images to be composited with a predetermined color.

12. A method according to claim 9, wherein the predetermined type of area is a closed area shape, and if the determining step determines that the image information added by the user on the sheet indicates a closed area, executing the process on the processing area of the images to be composited corresponding to the closed area indicated by the information.

13. A method according to claim 12, wherein the process is executed corresponding to a size of the closed area on the processing area of the images to be composited.

14. A method according to claim 9, further comprising outputting a composite image where the image information included in the read image and the secondary image are combined by the combining step.

15. A method according to claim 9, further comprising outputting the composite image laid out according to a layout designated by the user.

16. A method according to claim 9, further comprising determining a sheet size designated by a user for the composite image, based on the acquired read image, and printing the composite image according to the determined sheet size.

17. A non-transitory computer readable storage medium storing a computer executable code that, when executed, causes a computer to perform the method of claim 9.

* * * * *